(12) United States Patent
Mathai et al.

(10) Patent No.: US 10,082,684 B2
(45) Date of Patent: Sep. 25, 2018

(54) OPTICAL MODULATION EMPLOYING HIGH CONTRAST GRATING LENS

(71) Applicant: Hewlett Packard Enterprise Development LP, Houston, TX (US)

(72) Inventors: Sagi Varghese Mathai, Sunnyvale, CA (US); David A. Fattal, Mountain View, CA (US); Michael Renne Ty Tan, Menlo Park, CA (US); Wayne Victor Sorin, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/106,850

(22) PCT Filed: Jan. 24, 2014

(86) PCT No.: PCT/US2014/013059
§ 371 (c)(1),
(2) Date: Jun. 21, 2016

(87) PCT Pub. No.: WO2015/112166
PCT Pub. Date: Jul. 30, 2015

(65) Prior Publication Data
US 2017/0010482 A1    Jan. 12, 2017

(51) Int. Cl.
*G02F 1/01* (2006.01)
*G02F 1/017* (2006.01)
*H01S 3/00* (2006.01)

(52) U.S. Cl.
CPC ............ *G02F 1/0102* (2013.01); *G02F 1/017* (2013.01); *G02F 1/01* (2013.01);
(Continued)

(58) Field of Classification Search
CPC .......... G02F 1/01; G02F 1/017; G02F 1/0102; G02F 2201/30; G02F 2201/302; G02F 2201/307; G02F 2201/38; G02F 2203/28
(Continued)

(56) References Cited

U.S. PATENT DOCUMENTS

| | | | |
|---|---|---|---|
| 5,285,466 A | 2/1994 | Tabatabaie | |
| 5,428,635 A | 6/1995 | Zhiglinsky et al. | |

(Continued)

FOREIGN PATENT DOCUMENTS

| | | |
|---|---|---|
| KR | 20010003111 A | 1/2001 |
| WO | WO-2011093884 | 8/2011 |

(Continued)

OTHER PUBLICATIONS

F. Lu, F. G. Sedgwick, V. Karagodsky, C. Chase, and C. J. Chang-Hasnain, "Planar high-numerical-aperture low-loss focusing reflectors and lenses using subwavelength high contrast gratings," Opt. Express, vol. 18, No. 12, pp. 12606-12614, (2010).*
(Continued)

*Primary Examiner* — William R Alexander
(74) *Attorney, Agent, or Firm* — Hewlett Packard Enterprise Patent Department (57) ABSTRACT

A high contrast grating optical modulation includes an optical modulator at a front surface of a substrate to modulate received light. The high contrast grating optical modulation further includes a high contrast grating (HCG) lens adjacent to a back surface of the substrate opposite to the front surface to focus incident light onto the optical modulator. The substrate is transparent to operational wavelengths of the focused incident light and the modulated light.

15 Claims, 6 Drawing Sheets

(52) U.S. Cl.
CPC .. *G02F 2201/302* (2013.01); *G02F 2201/307* (2013.01); *G02F 2201/38* (2013.01); *G02F 2203/28* (2013.01); *H01S 3/0085* (2013.01)

(58) Field of Classification Search
USPC .................................. 359/260, 237, 245, 240
See application file for complete search history.

(56) References Cited

U.S. PATENT DOCUMENTS

| | | | |
|---|---|---|---|
| 6,829,286 | B1 | 12/2004 | Guilfoyle et al. |
| 6,856,460 | B2 | 2/2005 | Coleman et al. |
| 7,194,016 | B2 | 3/2007 | Bullington et al. |
| 8,059,690 | B2 | 11/2011 | Chang-Hasnain et al. |
| 8,189,643 | B2 | 5/2012 | Chang-Hasnain et al. |
| 8,340,483 | B2 | 12/2012 | Lee et al. |
| 8,488,646 | B2 * | 7/2013 | Chang-Hasnain ... G02B 5/1809 359/558 |
| 8,526,471 | B2 | 9/2013 | Chang-Hasnain et al. |
| 8,861,060 | B2 * | 10/2014 | Puegner ............... G01J 3/0202 359/197.1 |
| 9,065,239 | B2 | 6/2015 | Joseph et al. |
| 9,530,905 | B2 | 12/2016 | Wang et al. |
| 2002/0076128 | A1 * | 6/2002 | LoCascio ............. G02F 1/3515 385/5 |
| 2003/0117681 | A1 | 6/2003 | Tayebati |
| 2004/0136074 | A1 * | 7/2004 | Ford .................... G02B 6/2931 359/572 |
| 2008/0055698 | A1 | 3/2008 | Yurlov et al. |
| 2011/0280269 | A1 | 11/2011 | Chang-Hasnain et al. |
| 2012/0027350 | A1 | 2/2012 | Fu et al. |
| 2012/0128019 | A1 | 5/2012 | Chang-Hasnain et al. |
| 2012/0281950 | A1 | 11/2012 | Fattal et al. |
| 2013/0028279 | A1 | 1/2013 | Iakovlev et al. |
| 2013/0051410 | A1 | 2/2013 | Chang-Hasnain et al. |
| 2013/0051419 | A1 * | 2/2013 | Chang-Hasnain ... G02B 5/1809 372/45.01 |
| 2013/0058370 | A1 | 3/2013 | Chang-Hasnain et al. |
| 2013/0209110 | A1 | 8/2013 | Fattal et al. |
| 2015/0010271 | A1 | 1/2015 | Fattal et al. |
| 2015/0160384 | A1 * | 6/2015 | Arbabi ..................... G02B 5/13 359/238 |

FOREIGN PATENT DOCUMENTS

| | | |
|---|---|---|
| WO | WO-2011093895 | 8/2011 |
| WO | WO-2011136759 A1 | 11/2011 |
| WO | WO-2012144997 A1 | 10/2012 |
| WO | WO-2012149497 A2 | 11/2012 |
| WO | WO-2012155911 A1 | 11/2012 |
| WO | WO-2013085535 A1 | 6/2013 |
| WO | WO-2013105959 A1 | 7/2013 |
| WO | WO-2013109264 A1 | 7/2013 |
| WO | WO-2014189507 | 11/2014 |
| WO | WO-2014204468 | 12/2014 |

OTHER PUBLICATIONS

Ansbaek, T., Vertical-cavity Surface-emitting Lasers for Medical Diagnosis, (Research Paper), Sep. 30, 2012.
Bisaillon, E. et al., Resonant Grating Based Fabry-Perot Cavity in AlGaAs/GaAs, (Research Paper), Jul. 6, 2006.
Karagodsky, Matrix Fabry-Perot resonance mechanism in high-contrast gratings, (Web Page), May 1, 2011. <http://www.opticsinfobase.org/ol/abstract.cfm?uri=ol-36-9-1704>.
Weijian Yang et al., "High Speed, Ultra-compact Spectrometer Using High Contrast Grating Swept-wavelength Detector," 2013 IEEE Avionics, Fiber-Optics and Photonics Conference (AVFOP), Oct. 1-3, 2013. pp. 86-87.
Ansbaek, T. et al., "1060-nm Tunable Monolithic High Index Contrast Subwavelength Grating VCSEL," (Research Paper), Photonics Technology Letters, IEEE 25.4, Feb. 15, 2013, pp. 365-367.
Chevallier, C. et al., "Optimized Si/SiO2 high contrast grating mirror design for mid-infrared wavelength range: robustness enhancement," (Research Paper), Nov. 18, 2011, pp. 1-13, available at http://arxiv.org/pdf/1111.4101.pdf.
Extended European Search Report dated May 15, 2017 for EP application No. 13896275.8; pp. 10.
Extended European Search Report dated Nov. 28, 2016 for EP Application No. 13885204.1; pp. 9.
Fanglu Lu et al: "Planar high-numerical-aperture low-loss focusing reflectors and lenses using subwavelength high contrast gratings", Optics Express, vol. 18, No. 12, Jun. 7, 2010 (Jun. 7, 2010), pp. 12606-1347, XP05516268, DOI: 10.1364/OE. 18.012606 *the whole document*.
Fattal, D. et al. "A Silicon Lens for Integrated Free-Space Optics," Integrated Photonics Research, Silicon and Nanophotonics, Optical Society of America, 2011, 4 pages.
Fattal, D. et al., "Flat Dielectric Grating Reflectors with Focusing Abilities"; (Research Paper), Nature Photonics 4.7, May 2, 2010, pp. 466-470.
International Search Report & Written Opinion received in PCT Application No. PCT/US2013/042261, dated Feb. 26, 2014, 11 pages.
International Search Report & Written Opinion received in PCT Application No. PCT/US2013/067342, dated Jul. 24, 2014, 12 pages.
Lin, C-K et al., "High-Speed 985 nm Bottom-Emitting VCSEL Arrays for Chip-to-Chip Parallel Optical Interconnects," Selected Topics in Quantum Electronics, IEEE Journal of 13.5, 2007, pp. 1332-1339.

\* cited by examiner

OPTICAL MODULATION EMPLOYING HIGH CONTRAST GRATING LENS

CROSS-REFERENCE TO RELATED APPLICATIONS

N/A

STATEMENT REGARDING FEDERALLY SPONSORED RESEARCH OR DEVELOPMENT

N/A

BACKGROUND

Optoelectronic devices used in modern optoelectronic and photonic applications generally include emitters that generate light such as, but not limited to, lasers and light emitting diodes (LEDs), photodetectors such as, but not limited to, photodiodes that receive and detect light, and optical modulators to modulate one or both of an amplitude and a phase of the light. For example, a popular emitter used in many photonic systems is a vertical cavity surface emitting laser (VCSEL). VCSELs are relatively inexpensive to manufacture and utilize while being characterized by relatively high performance and reliability. Photodiodes based on p-n and p-i-n semiconductor junctions (e.g., PN photodiodes, PIN photodiodes, etc.) are also very common in modern photonic system and may provide high performance (e.g., high speed) with concomitant exceptionally good reliability at relatively low cost. Optical modulators may include, but are not limited to, Fabry-Perot modulators, modulators based on multiple quantum wells, and various light valve based modulators (e.g., liquid crystal light valves).

In many cases, a lens is used and may even be required for proper operation of an optoelectronic device. For example, a lens may be used to focus or collimate light produced by a VCSEL. The focusing may facilitate interfacing the VCSEL with an optical fiber in an optical communication system, for example. Similarly, lenses may be employed to concentrate and focus light onto an active area of a photodetector or an optical modulator to improve one or both of reception and detection of light.

BRIEF DESCRIPTION OF THE DRAWINGS

Various features of examples in accordance with the principles described herein may be more readily understood with reference to the following detailed description taken in conjunction with the accompanying drawings, where like reference numerals designate like structural elements, and in which.

Certain examples have other features that are one of in addition to and in lieu of the features illustrated in the above-referenced figures. These and other features are detailed below with reference to the above-referenced figures.

DETAILED DESCRIPTION

Examples in accordance with the principles described herein provide optoelectronics that employ a high contrast grating to focus light. In particular, a high contrast grating is configured as a lens to focus light onto an optical modulator, according to various examples of the principles described herein. Further, according to various examples, the light focused by the high contrast grating lens is configured to pass through a substrate between the high contrast grating lens and the optical modulator. As such, a 'back illuminated' optical modulation apparatus is provided and the high contrast grating lens is located adjacent to the back surface of a substrate supporting the optical modulation apparatus. Moreover, the high contrast grating lens on or adjacent to a back side of the substrate facilitates integration with the optical modulator in the form of the optical modulation apparatus. The optical modulation apparatus including the integrated high contrast grating lens may enable flip-chip mounting of the optical modulation apparatus, according to some examples.

Herein, a high contrast grating is defined as a subwavelength diffraction grating having a large refractive index contrast. In particular, the large refractive index contrast of the high contrast grating may be provided by grating elements (e.g., strips, bars, posts, etc.) having a relatively high refractive index that are substantially surrounded by a material or a medium having a relatively low refractive index, according to some examples. For example, the high contrast grating may include a plurality of spaced-apart bars (i.e., the grating elements) of a high refractive index or 'high index' material (e.g., silicon, aluminum gallium arsenide, etc.) surrounded by air, silicon dioxide, aluminum oxide or another relatively low refractive index or 'low index' material. In other examples, the low index material is only between the grating elements that include the high index material. In yet other examples, the low index material may be between the grating elements and also one of above or below the grating elements that include the high index material. According to various examples, one or both of the high index material and the low index material is selected to be substantially transparent at an operational wavelength of the high contrast grating.

In some examples, the high contrast grating includes the same low index material or medium between each of the high index grating elements as well as above and below the high index grating elements. In other examples, a material between the high index grating elements includes a first low index material, while a second low index material is one or both of above and below the high index grating elements. In yet other examples, a material above the high index grating elements is the second low index material and a third low index material is below the high index grating elements.

According to various examples, a difference between the refractive index of the high index material and the refractive index of the low index material is determined by a particular application or use of the high contrast grating including, but not limited to, an operational wavelength of the high contrast grating. In some examples, the relatively high refractive index may be about 2 or more times greater than the relatively low refractive index. For example, the grating elements may including a material having a refractive index that is greater than about 2.0 and the material or medium surrounding the grating elements may have a refractive index of about 1.0. In another example, the high index material may have a refractive index of about 3.5 (e.g., silicon, germanium, etc.) and the low index material may have a refractive index of between about 1.0 and about 2.0 (e.g., silicon dioxide, germanium dioxide).

According to some examples, the high contrast grating is substantially planar and may be characterized as either a one-dimensional (1-D) grating structure or a two-dimensional (2-D) grating structure. In particular, the high contrast grating may be implemented in a substantially planar layer as a 1-D or 2-D array of high contrast grating elements. For example, a 1-D high contrast grating may include a plurality of substantially parallel bars or strips arranged in a planar layer. In another example, a quasi-2D high contrast grating may include a plurality of curved bars or strips, or bars whose width is varied along the bar. In yet another example, a plurality of spaced-apart rectangular, circular or elliptical, etc., elements arranged in a layer as a 2-D array may provide a 2-D high contrast grating. According to various examples, the high contrast grating may be either a periodic grating or a substantially non-periodic (i.e., aperiodic) grating.

Figure 1:
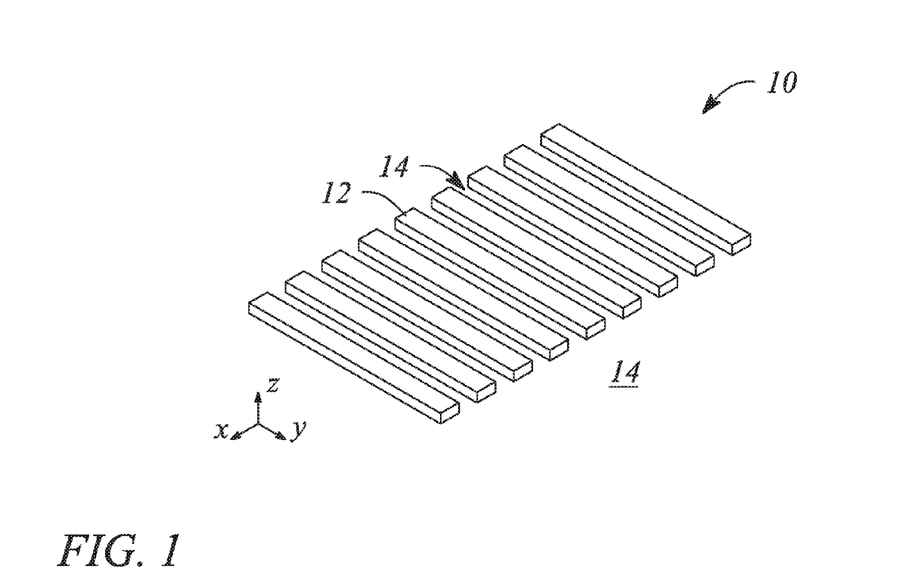
FIG. 1 illustrates a perspective view of a high contrast grating, according to an example consistent with the principles described herein.

FIG. 1 illustrates a perspective view of a high contrast grating 10, according to an example consistent with the principles described herein. In particular, the high contrast grating 10 illustrated in FIG. 1 is a 1-D high contrast grating 10. The high contrast grating 10 includes a plurality of substantially parallel, rectangular bars 12 arranged in a planar layer (e.g., a layer in an x-y plane, as illustrated). A center-to-center spacing between the rectangular bars 12 is less than a wavelength at which the high contrast grating 10 is to be operated or used (i.e., an operational wavelength). The rectangular bars 12 include a material having a high refractive index and are surrounded by a medium 14 having a low refractive index. For example, the rectangular bars 12 may include silicon, while the medium 14 may include silicon dioxide, or air, as illustrated.

Herein, a high contrast grating (HCG) lens is defined as a high contrast grating configured to function as a lens to focus or collimate light. Further, by definition herein, the HCG lens includes a high contrast grating having a grating pitch small enough to substantially suppress all but a zeroth ($0^{th}$) order diffraction mode at an operational wavelength of the HCG lens. According to various examples, all higher order diffraction modes are below a cutoff at the operational wavelength of the HCG lens. In particular, by definition herein, the HCG lens is a non-periodic, high contrast grating that supports only the zeroth order diffraction mode and that is configured to provide a predetermined phase front modification to the light passing through the HCG lens, where the phase front modification is consistent with that of a lens (e.g., the HCG lens acts to bend and focus light). For example, the phase front modification may be consistent with that provided by a refractive lens.

In some examples (not illustrated), one or both of a spacing between grating elements and a width or size of the grating elements of the HCG lens is varied as a function of distance across or along a grating structure of the HCG lens to provide the predetermined phase front modification. In some examples (e.g., as illustrated in FIG. 1), the HCG lens may be a 1-D lens in which the pre-determined phase front modification is provided in only one direction (e.g., an x-direction substantially parallel to a plane of the HCG lens). In other examples, the HCG lens is a 2-D lens configured to provide the predetermined phase front modification in two substantially orthogonal directions (e.g., an x-direction and a y-direction). According to various examples, the predetermined phase front modification provided by the HCG lens may correspond to or be consistent with a phase front modification provided by substantially any arbitrary lens (e.g., any refractive lens design or shape). For example, the predetermined phase front modification of or provided by the HCG lens may be consistent with that of a convex lens (e.g., refractive plano-convex, refractive biconvex, etc.). In some examples, the HCG lens may implement a collimating lens. In some examples, the HCG lens may implement an off-axis or tilted beam lens.

Herein, an 'electrorefraction modulator' is defined as a device used to modulate light using an electro-optic effect. In particular, the electro-optic effect in the electrorefraction modulator is a change in refractive index produced by an electric field applied to or carrier injection/depletion into the electrorefraction modulator, by definition herein. The change in refractive index in an electrorefraction modulator produces a change in an optical length (e.g., cavity resonant length) resulting in optical modulation of light leaving the electrorefraction modulator. Herein, an 'electroabsorption modulator' is defined as a device used to modulate light using a change in optical absorption or optical gain produced by an electric field applied to or carrier injection into the electroabsorption modulator, respectively. In particular, in an electroabsorption modulator, optical absorption or gain may cause a change in a quality factor or 'Q' of a cavity leading to modulation of light exiting the cavity.

Further, as used herein, the article 'a' is intended to have its ordinary meaning in the patent arts, namely 'one or more'. For example, 'a lens' means one or more lenses and as such, 'the lens' means 'the lens(es)' herein. Also, any reference herein to 'top', 'bottom', 'upper', 'lower', 'up', 'down', 'front', 'back', 'left' or 'right' is not intended to be a limitation herein. Herein, the term 'about' when applied to a value generally means within the tolerance range of the equipment used to produce the value, or in some examples, means plus or minus 10%, or plus or minus 5%, or plus or minus 1%, unless otherwise expressly specified. Further, herein the term 'substantially' as used herein means a majority, or almost all, or all, or an amount with a range of about 51% to about 100%, for example. Moreover, examples herein are intended to be illustrative only and are presented for discussion purposes and not by way of limitation.

Figure 2:
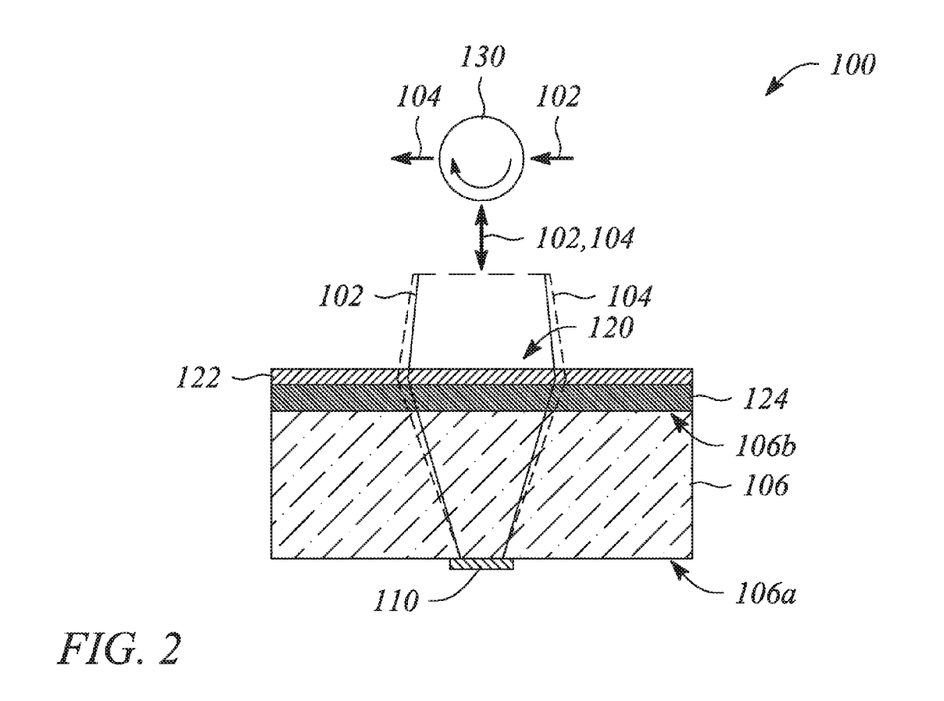
FIG. 2 illustrates a cross-sectional view of an optical modulation apparatus, according to an example of the principles described herein.

FIG. 2 illustrates a cross-sectional view of an optical modulation apparatus 100, according to an example of the principles described herein. According to some examples, the optical modulation apparatus 100 is illuminated by light 102 incident on the optical modulation apparatus 100. The incident light 102 may be substantially un-modulated or direct current 'DC' light. For example, the incident light 102 may be emitted by a DC light source such as, but not limited to, a laser or a light emitting diode (LED). In another example, the incident light 102 may be an output beam from an optical fiber. The optical modulation apparatus 100 is configured to modulate the incident light 102 and produce modulated light 104, according to various examples. In FIG. 2, an extent of the incident light 102 is illustrated using a solid line, while an extent of the modulated light 104 is illustrated using a dashed line. Bold arrows are also used to illustrate a direction of the incident light 102 and modulated light 104, respectively.

According to various examples, a substrate 106 of the optical modulation apparatus 100 is substantially transparent to the incident light 102 and may be configured for attachment using so-called 'flip-chip' attachment to a carrier or motherboard adjacent to a first or 'front' side or surface 106a of the substrate 106. In particular, the substrate 106 is substantially transparent to light (e.g., the incident light 102) at an operational wavelength of the optical modulation apparatus 100, according to various examples. Further, to support the flip-chip attachment, the optical modulation apparatus 100 is configured to receive the incident light 102 through a second or 'back' side or surface 106b of the substrate 106 opposite the front surface 106a, according to various examples. The incident light 102 may readily pass through the substantially transparent substrate 106 with relatively little optical loss at the operational wavelength of the optical modulation apparatus 100, according to various examples. Electrical contacts or pads and other circuit elements (not illustrated in FIG. 2) used to interconnect and power the optical modulation apparatus 100 may be provided on the front surface 106a to facilitate flip-chip attachment, according to various examples.

The optical modulation apparatus 100 includes an optical modulator 110. According to various examples, the optical modulator 110 is at the front surface 106a of the substrate 106 of the optical modulation apparatus 100. The optical modulator 110 is configured to modulate light received by the optical modulation apparatus 100, according to various examples. The light modulated by the optical modulator 110 is emitted as modulated light 104. In some examples, the optical modulator 110 is a reflective optoelectronic modulator configured to emit the modulated light 104 through the substrate 106 and out the back surface 106b. In other examples, the optical modulator 110 is a transmissive optoelectronic modulator configured to emit the modulated light 104 in a direction away from the substrate 106.

According to some examples, the optical modulator 110 is a Fabry-Perot modulator 110. The Fabry-Perot modulator 110 includes a Fabry-Perot cavity. The Fabry-Perot cavity includes a pair of spaced apart reflectors, according to various examples. According to various examples, a modulation material is included within the Fabry-Perot cavity to produce the Fabry-Perot modulator 110. The modulation material may one or both of change an optical length and change a quality factor Q of the Fabry-Perot cavity 110 to provide optical modulation, in some examples. The change in one or both the optical length and the quality factor may be provided according to a variety of means or effects including, but not limited to, an electro-optic effect (e.g., a linear or Pockels electro-optic effect, a quadratic or Kerr/Franz-Keldysh electro-optic effect), free carrier plasma dispersion (e.g., by carrier injection, carrier depletion, etc.), heat and various acoustic or mechanical means.

In some examples, the Fabry-Perot modulator 110 is an electrorefraction modulator (i.e., provides modulation by electrorefraction) and further includes an electrorefraction material (i.e., the modulation material) within the Fabry-Perot cavity. In other examples, the Fabry-Perot modulator 110 is an electroabsorption modulator (i.e., provides modulation by electroabsorption) and further includes an electroabsorption material (i.e., the modulation material) within the Fabry-Perot cavity. In some examples, the Fabry-Perot modulator 110 includes both an electrorefraction material and an electroabsorption material within the Fabry-Perot cavity. For example, the material within the Fabry-Perot cavity may provide both electrorefraction and electroabsorption. In these examples, the Fabry-Perot modulator 110 may be both an electrorefraction modulator and an electroabsorption modulator.

Figure 3:
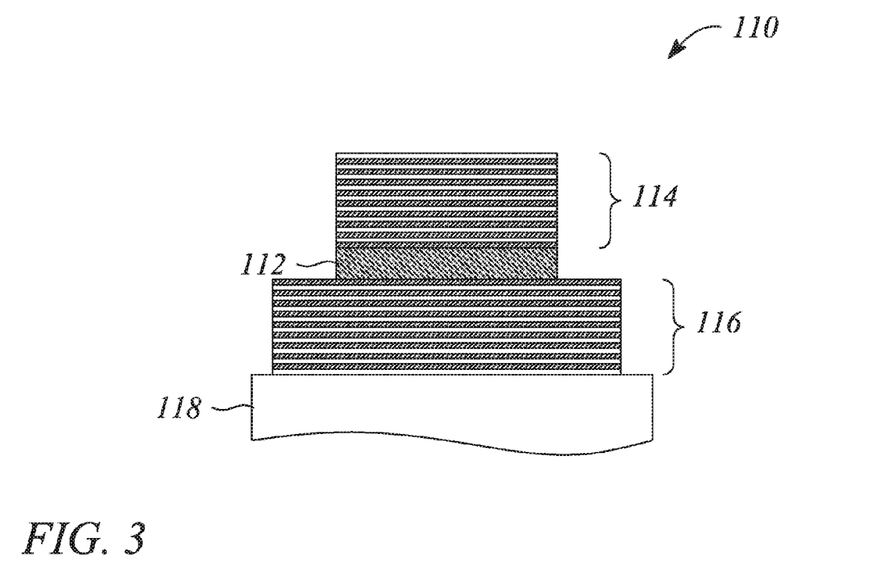
FIG. 3 illustrates a cross-sectional view of a Fabry-Perot modulator, according to an example consistent with the principles described herein.

FIG. 3 illustrates a cross-sectional view of a Fabry-Perot modulator 110, according to an example consistent with the principles described herein. In particular, the Fabry-Perot modulator 110 is a vertical cavity Fabry-Perot modulator. As illustrated, the Fabry-Perot modulator 110 includes an active layer 112 between a pair of layers 114, 116 on either side of the active layer 112 that serves as reflectors to define the Fabry-Perot cavity. The reflector layers 114, 116 are also known as Fabry-Perot etalon plates or layers. As illustrated, the Fabry-Perot modulator 110 may be on a substrate 118. In some examples, the substrate 118 may be substantially transparent. In some examples, the substrate 118 may be the substrate 106 of the optical modulation apparatus 100.

In some examples, one or both of the reflector layers 114, 116 may include a distributed Bragg reflector (DBR). For example, the DBR of one or both of the reflector layers 114, 116 may include alternating layers of materials with differing refractive indices including, but not limited to, silicon (Si) alternating with silicon dioxide ($SiO_2$), indium phosphide (InP) alternating with indium gallium arsenide phosphide (InGaAsP), aluminum oxide ($AlO_x$) alternating with gallium arsenide (GaAs), aluminum gallium arsenide (AlGaAs) alternating with GaAs, and aluminum gallium arsenide (AlGaAs) alternating with aluminum arsenide (AlAs). In other examples, one or both of the reflector layers 114, 116 may include another type of reflector including, but not limited to, a metal reflector and a high contrast grating (HCG) mirror.

According to some examples, the active layer 112 may include a bulk semiconductor. For example, the bulk semiconductor may include a semiconductor material such as, but not limited to, gallium arsenide (GaAs), indium phosphide (InP), or combinations thereof. The bulk semiconductor may be intrinsically or substantially un-doped, for example. According to some examples, the reflector layers 114, 116 in combination with the bulk semiconductor material of the active layer 112 may form a p-i-n or PIN diode.

In other examples, the active layer 112 may include multiple quantum wells (MQWs), e.g., in layers or as quantum dots. The MQWs located with in the active layer 112 may provide electroabsorption modulation in the Fabry- Perot modulator 110, according to some examples. In particular, electroabsorption modulation may be associated with using the so-called 'quantum-confined Stark effect' in the active layer 112 that includes MQWs. For example, the MQWs of the active layer 112 may include a plurality of alternating layers of gallium arsenide (GaAs) and aluminum gallium arsenide (AlGaAs). Each layer of the plurality of layers may be about 100 angstroms (Å) thick (e.g., 100-Å GaAs/100-Å $AlO_{0.2}Ga_{0.8}As$), for example. Application of an electric field to the MQWs substantially perpendicular to the alternating layers may change or shift a level or amount of an optical absorption in the quantum wells (e.g., the GaAs layers) formed by the alternating layers (i.e., the quantum-confined Stark effect), resulting in an overall change in the optical absorption of the active layer 112. In another example, the alternating layers of the MQWs may include, but are not limited to, indium gallium arsenide (InGaAs) layers alternating with AlGaAs layers, indium gallium arsenide phosphide (InGaAsP) layers alternating with InP, and germanium (Ge) layers alternating with silicon germanium (SiGe) layers. According to some examples, the reflector layers 114, 116 in combination with the MQWs of the active layer 112 may form an a p-i-n or PIN diode structure (e.g., with the reflector layers 114, 116 as the n-type and p-type layers, respectively, and the MQWs as the intrinsic or 'i' layer). According to other examples, another layer or layers within the active layer 112 may act as respective one(s) of the n-type and p-type layers of the PIN diode structure.

According to some examples, the substrate 106 of the optical modulation apparatus 100 may be a Fabry-Perot modulator substrate that includes a semiconductor material such as, but not limited to, gallium arsenide (GaAs), indium phosphide (InP), or combinations thereof. For example, the reflector layers 114, 116 and intervening active layer 112 may be fabricated one or both of on and in the semiconductor material of the substrate 106. In other examples, the substrate 106 may include a dielectric material such as, but not limited to, glass, as a support substrate on which the Fabry-Perot modulator 110 is fabricated.

In other examples, the Fabry-Perot modulator 110 may include a Fabry-Perot modulator chip or wafer that is attached to the front surface 106a of the substrate 106. The Fabry-Perot modulator chip or wafer containing a plurality of optoelectronic layers that form the Fabry-Perot modulator 110 may be attached to the front surface 106a by wafer bonding, for example. The attached Fabry-Perot modulator 110 chip or wafer is configured to modulate the incident light 102 received through the substrate 106, according to various examples. For example, the Fabry-Perot modulator 110 chip or wafer may include, but is not limited to, a plurality of layers of semiconductor materials such as, but not limited to, GaAs, InP, AlGaAs and InGaAs. The Fabry-Perot modulator 110 chip or wafer may be wafer bonded to another material to act as the substrate 106. For example, materials other than GaAs and InP such as, but not limited to, silicon (Si) and glass, may be used as the substrate 106 onto which the Fabry-Perot modulator 110 chip or wafer is wafer bonded. In some examples, the substrate 106 and the Fabry-Perot modulator 110 chip or wafer may include substantially the same material.

Referring again to FIG. 2, the optical modulation apparatus 100 further includes a high contrast grating (HCG) lens 120. The HCG lens 120 is adjacent to a back surface 106b of the substrate opposite to the front surface 106a. The HCG lens 120 is configured to focus light incident on the optical modulation apparatus 100. In particular, the HCG lens 120 is configured to focus the incident light 102 onto the optical modulator 110, e.g., the Fabry-Perot modulator, according to various examples. The focused incident light serves as the received light that is modulated by the optical modulator 110. In some examples, the HCG lens 120 is further configured to tilt or slant (i.e., change a direction of) the focused incident light relative to a direction of the incident light 102. In some examples, the HCG lens 120 also is configured to focus the modulated light 104 produced by the optical modulator 110. For example, the HCG lens 120 may collimate the modulated light 104 produced or emitted by the optical modulator 110 in a direction toward the back surface 106b of the substrate 106. In some examples, the HCG lens 120 is a one-dimensional (1-D) lens. In other examples, the HCG lens 120 is a two-dimensional (2-D) lens.

According to some examples, the HCG lens 120 may include a layer of a first material. The first material layer may be separated from the substrate 106 back surface 106b by one or both of a spacer and a cavity having a refractive index that is lower relative to the refractive index of the first layer material of the HCG lens 120. Various configurations of the HCG lens 120 including the layers thereof are described in more detail below.

In some examples (e.g., as illustrated in FIG. 2), the HCG lens 120 may include an HCG layer 122 adjacent to the back surface 106b of the substrate 106. In some examples, the HCG layer 122 may be spaced apart from the back surface 106b by a spacer layer 124. In various examples, the HCG layer 122 may be a layer of material such as, but not limited to, Si, GaAs, InP or other semiconductor materials. For example, the HCG layer 122 may include, but is not limited to, a layer of amorphous Si, poly-Si, or silicon carbide (SiC).

According to various examples, the spacer layer or spacer 124 serves as a standoff to separate the HCG layer 122 from the substrate back surface 106b. In these examples (not illustrated in FIG. 2), the HCG layer 122 may be suspended over and spaced apart from the back surface 106b of the substrate 106 by the spacer layer or spacer 124. Further, the spacer or spacer layer 124 may include a cavity (not illustrated in FIG. 2) between the HCG lens 120 and the substrate 106 (e.g., see discussion below with respect to FIG. 6). For example, the HCG layer 122 including amorphous Si may be spaced apart from the substrate back surface 106b by the spacer 124 that includes silicon dioxide ($SiO_2$). The $SiO_2$ spacer 124 may be formed by a layer of $SiO_2$ acting as a sacrificial layer using microelectromechanical systems (MEMS) fabrication techniques to suspend a portion of the HCG layer 122 that includes the HCG lens 120, for example. In particular, the cavity may be provided by removal of a portion of the sacrificial layer below HCG layer 122 to suspend the portion of the HCG layer 122 that includes the HCG lens 120.

Figure 6:
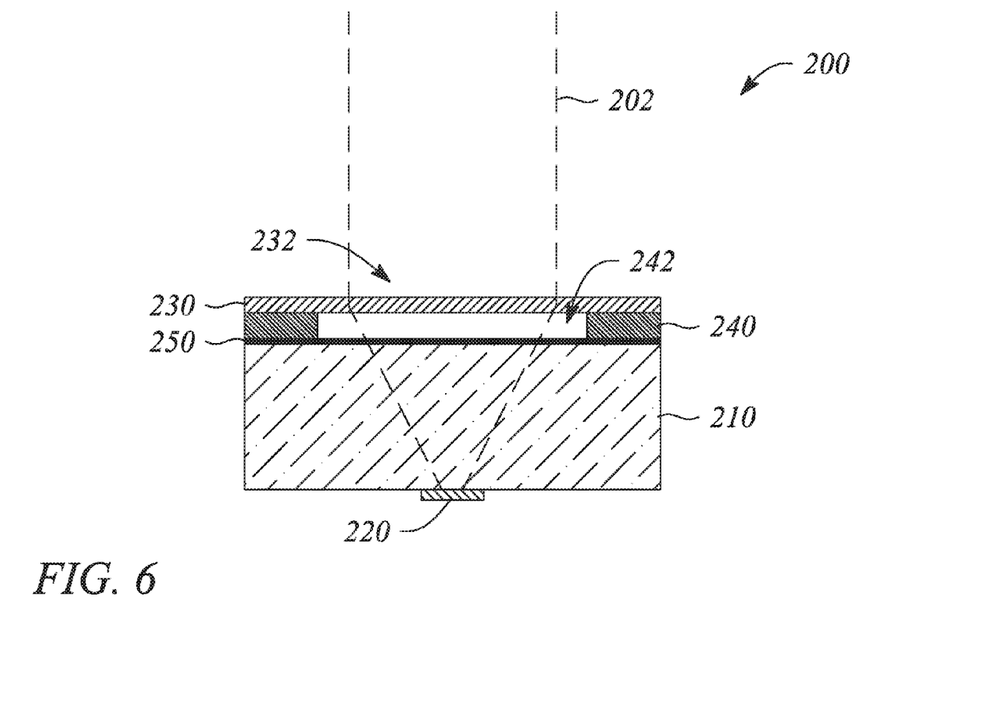
FIG. 6 illustrates a cross-sectional view of an optoelectronic modulation apparatus employing a high contrast grating, according to an example consistent with the principles described herein.

In some examples, the HCG lens 120 is suspended in air and the cavity is an air-filled cavity, for example as illustrated in FIG. 6 described below. In particular, air may surround the HCG lens 120 and fill in between the high index grating elements thereof. Further, air may substantially fill the cavity between the HCG layer 122 and the back surface 106b of the substrate 106. In other examples (also not illustrated in FIG. 2), another material may fill or at least partially fill the cavity. For example, the cavity may be filled by another low refractive index material other than air or even a vacuum. In another example, the cavity may be filled or partially filled by an encapsulating material, for example, see FIG. 8. In particular, the HCG lens 120 may be encapsulated by the encapsulating material or 'encapsulant.' The encapsulating material may protect the HCG lens 120, according to some examples. For example, the encapsulating material may protect the HCG lens 120 from processing (e.g., etching, etc.) that occurs after the fabrication of the HCG lens 120 or from an operational environment. The encapsulating material may include, but is not limited to, silicon nitride or a similar material having a low refractive index relative to a material of the HCG lens 120. In other examples, the encapsulating material may be a liquid polymer or glass material that is, for example, spin coated onto the surface. In yet other examples, the encapsulating material may include a polymer or glass film laminated onto the HCG layer 122 to cover the HCG lens 120. For example, see FIG. 8 described below.

In some examples, the optical modulation apparatus 100 further includes a means for separating the incident light 102 and the modulated light 104. For example, as illustrated in FIG. 2, the optical modulation apparatus 100 may further include an optical circulator 130 (illustrated schematically) to separate the modulated light 104 produced by the optical modulator 110 from the incident light 102. In particular, the incident light 102 enters the optical circulator 130 and is directed toward the optical modulator 110. Following modulation by the optical modulator 110 (e.g., the Fabry-Perot optical modulator), the modulated light 104 re-enters the optical circulator 130 and is then directed by the optical circulator 130 in a direction that differs from a direction of the incident light 102. In other examples, another means of separating the incident light 102 from the modulated light 104 may be employed.

Figure 4:
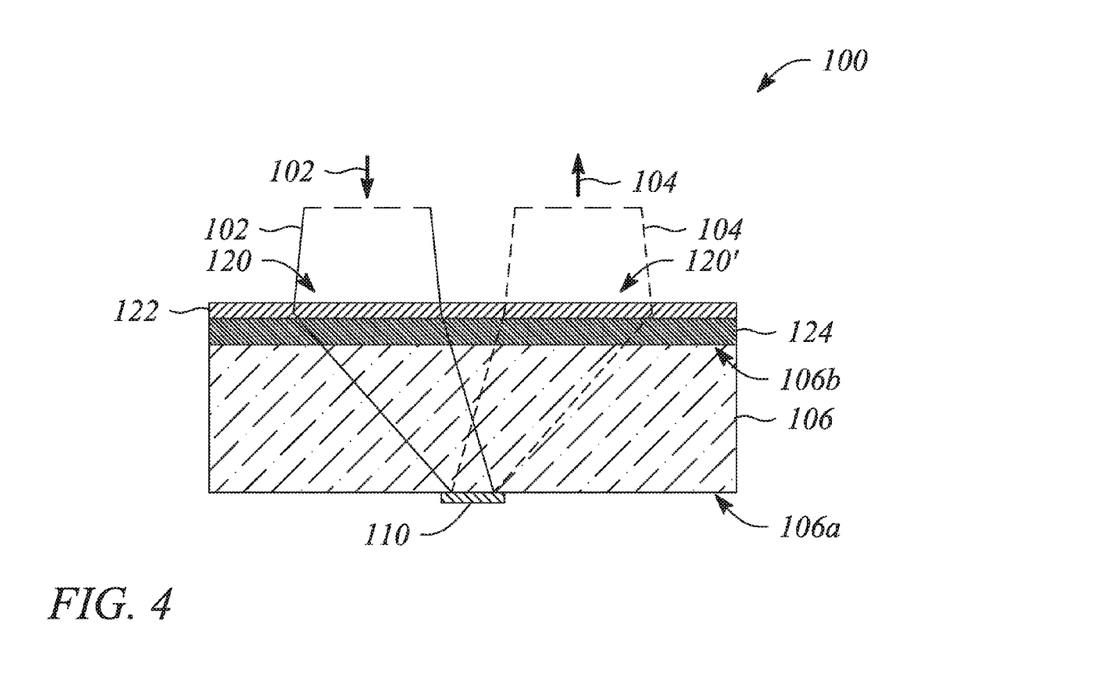
FIG. 4 illustrates a cross-sectional view of an optical modulation apparatus, according to another example consistent with the principles described herein.

FIG. 4 illustrates the optical modulation apparatus 100, according to another example consistent with the principles described herein. In particular, FIG. 4 illustrates the optical modulation apparatus 100 further comprising another HCG lens 120'. The other HCG lens 120' is adjacent to and in some examples spaced from the back surface 106b of the substrate 106 and laterally displaced from the first-mentioned HCG lens 120, as illustrated. The first HCG lens 120 is configured to focus the incident light 102, and the other or second HCG lens 120' is configured to focus the modulated light 104 produced by the optical modulator 110, for example the Fabry-Perot modulator 110. The lateral displacement of the first or incident light-focusing HCG lens 120 and the second or modulated light-focusing HCG lens 120' provides the separation of the incident light 102 and the modulated light 104. Specifically, the incident light 102 is focused and tilted by the incident light focusing HCG lens 120 onto the Fabry-Perot modulator 110. The Fabry-Perot modulator 110 modulates the focused and tilted incident light 102 to produce modulated light 104 that propagates in a direction toward the other HCG lens 120'. The other HCG lens 120' focuses and tilts the modulated light 104 that exits the optical modulation apparatus 100, as illustrated. Note that the focused and tilted modulated light 104 is laterally displaced from the incident light 102 by virtue of the lateral displacement of the other HCG lens 120' relative to the HCG lens 120 that focuses and tilts the incident light 102. As such, the incident light 102 and the modulated light 104 are separated from one another. As was the case for the optical modulation apparatus 100 illustrated in FIG. 2, the optical modulation apparatus 100 illustrated in FIG. 4 is a reflective optical modulation apparatus.

Figure 5:
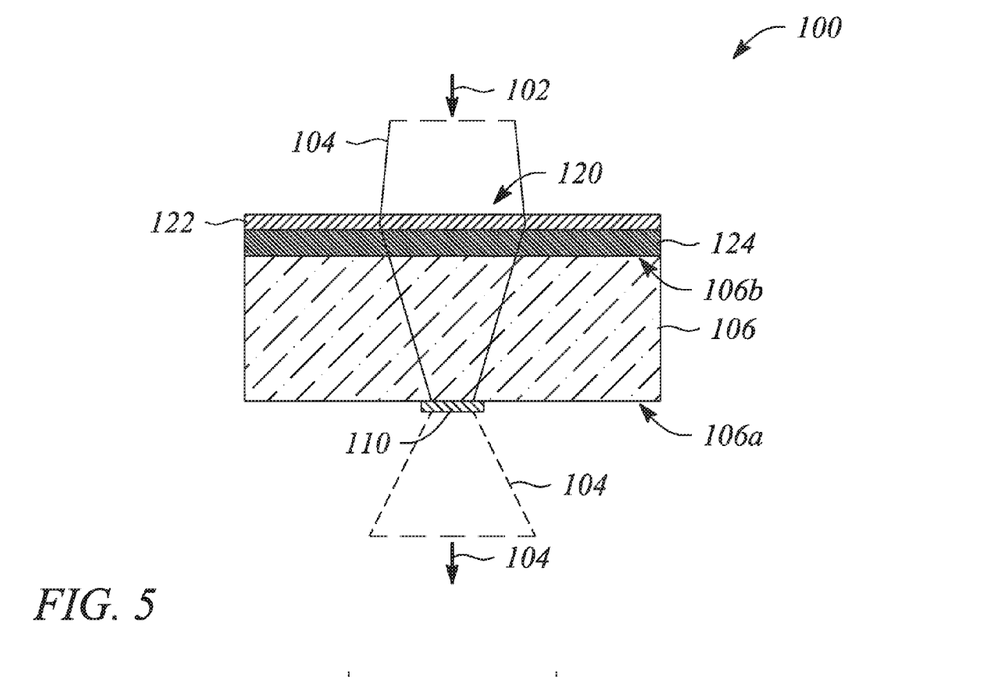
FIG. 5 illustrates a cross-sectional view of an optical modulation apparatus, according to yet another example consistent with the principles described herein.

FIG. 5 illustrates an optical modulation apparatus 100, according to yet another example consistent with the principles described herein. In particular, the optical modulation apparatus 100 illustrated in FIG. 5 is a transmissive optical modulation apparatus configured to emit the modulated light 104 away from the front surface 106a of the substrate 106. In other words, incident light 102 enters the optical modulation apparatus 100 through the HCG lens 120 at the back surface 106b of the substrate 106. The incident light 102 having been focused by the HCG lens 120 is then modulated by the optical modulator, e.g., the Fabry-Perot modulator 110, to produce the modulated light 104. The modulated light 104 exits the Fabry-Perot modulator 110 at the front surface 106a of the substrate 106 without re-entering the substrate 106. As such, the modulated light 104 is separated from the incident light 102 by the optical modulator 110, or more specifically by the presence of the substrate 106. Although not illustrated in FIG. 5, the HCG lens 120 may tilt the focused incident light 102 to provide further separation from the modulated light 104 that is directed away from the front surface 106a of the substrate 106. For example, tilting the incident light 102 may insure that any incident light 102 and modulated light 104 are not back reflected toward the source of the incident light 102.

In some examples (not illustrated in FIGS. 2-5), the optical modulation apparatus 100 further includes an antireflection coating, for example as illustrated and described below with respect to FIG. 6. The antireflection coating may be located on the substrate 106 between the HCG lens 120 and the back surface 106b of the substrate 106. The antireflection coating is an optical layer configured to reduce reflection of incident light 102 at the substrate back surface 106b, by definition herein. The antireflective coating may be deposited, for example, by vapor deposition, between the spacer 124 and the substrate 106. In other examples, the antireflective coating may be deposited by vapor deposition through openings of the HCG lens 120, according to some examples. For example, one or more layers that include a combination of silicon nitride and silicon dioxide (e.g., in varying ratios) may be used as an antireflection coating on the substrate 106 that, for example, includes silicon.

FIG. 6 illustrates a cross-sectional view of an optoelectronic modulation apparatus 200 employing a high contrast grating, according to an example consistent with the principles described herein. The optoelectronic modulation apparatus 200 includes a transparent substrate 210 having a first surface and a second surface opposite the first surface. The transparent substrate 210 is configured to transmit light 202 incident on the optoelectronic modulation apparatus 200. The transmitted incident light 202 may be at or include an operational wavelength of the optoelectronic modulation apparatus 200, for example. In particular, the transparent substrate 210 may be substantially transparent to the incident light at the operational wavelength. In some examples, the transparent substrate 210 may be substantially similar to the substrate 106 described above with respect to the optical modulation apparatus 100. FIG. 6 illustrates the incident light 202 as substantially collimated incident light, by way of example and not limitation.

The optoelectronic modulation apparatus 200 further includes an optoelectronic modulator 220. The optoelectronic modulator 220 is at the first surface of the transparent substrate 210, as illustrated in FIG. 6. In various examples, the optoelectronic modulator 220 is configured to modulate the transmitted incident light 202 received through the transparent substrate 210 second surface. In particular, the optoelectronic modulator 220 may provide modulation that is substantially similar to the modulation provided by a Fabry-Perot modulator, for example as described above for the optical modulator 110 of the optical modulation apparatus 100. In other examples, the optoelectronic modulator 220 may include another optical modulator such as, but not limited to, a multiple quantum well (MQW) modulator (e.g., without a Fabry-Perot cavity) and a liquid crystal light valve. Further, according to various examples, the optoelectronic modulator 220 may be either a reflective optical modulator or a transmissive optical modulator.

The optoelectronic modulation apparatus 200 further includes a high contrast grating (HCG) layer 230. The HCG layer 230 is adjacent to the second surface of the transparent substrate 210, according to various examples. Further, according to various examples, the HCG layer 230 is configured to provide an HCG lens 232 to focus the incident light 202. In particular, the HCG lens 232 is configured to focus the incident light 202 transmitted through the transparent substrate 210 onto the optoelectronic modulator 220 as the transmitted incident light 202.

In some examples, the optoelectronic modulation apparatus 200 further includes a spacer layer 240 between the HCG layer 230 and the transparent substrate 210. In some examples, the spacer layer 240 is configured to suspend the HCG lens 232 of the HCG layer 230 above and spaced from the second surface of the transparent substrate 210. In some examples, the spacer layer 240 may be substantially similar to the spacer layer 124, described above with respect to the optical modulation apparatus 100. In particular, the spacer layer 240 may serve as a standoff between the HCG layer 230 and the second surface of the transparent substrate 210. In particular, the spacer layer 240 may provide a space or cavity between the HCG lens 232 and the transparent substrate 210, as described below. In other examples (not illustrated), a hole, cavity, or depression may be provided (e.g., by etching) in the transparent substrate 210 itself (e.g., as opposed to the spacer layer 240) and the HCG layer 230 may be suspended above the hole, cavity or depression in the substrate 210, for example.

FIG. 6 further illustrates the spacer layer 240 including a cavity 242 to suspend the HCG lens 232. In particular, the HCG layer 230 spans across an opening in the spacer layer 240 that forms the cavity 242. The HCG lens 232 is located in a portion of the HCG layer 230 that spans the opening to suspend the HCG lens 232 over the cavity 242. FIG. 6 also illustrates an antireflection layer 250 between the cavity 242 and the second surface of the substrate 210. The antireflection layer 250 may be substantially similar to the antireflection layer described above with respect to the optical modulation apparatus 100, for example. In other examples (not illustrated in FIG. 6), the spacer layer 240 does not include a cavity. In these examples, the spacer layer 240 may be located under and provide support to the HCG layer 230 including the HCG lens 232, for example as illustrated in FIGS. 2, 4 and 5).

Figure 7:
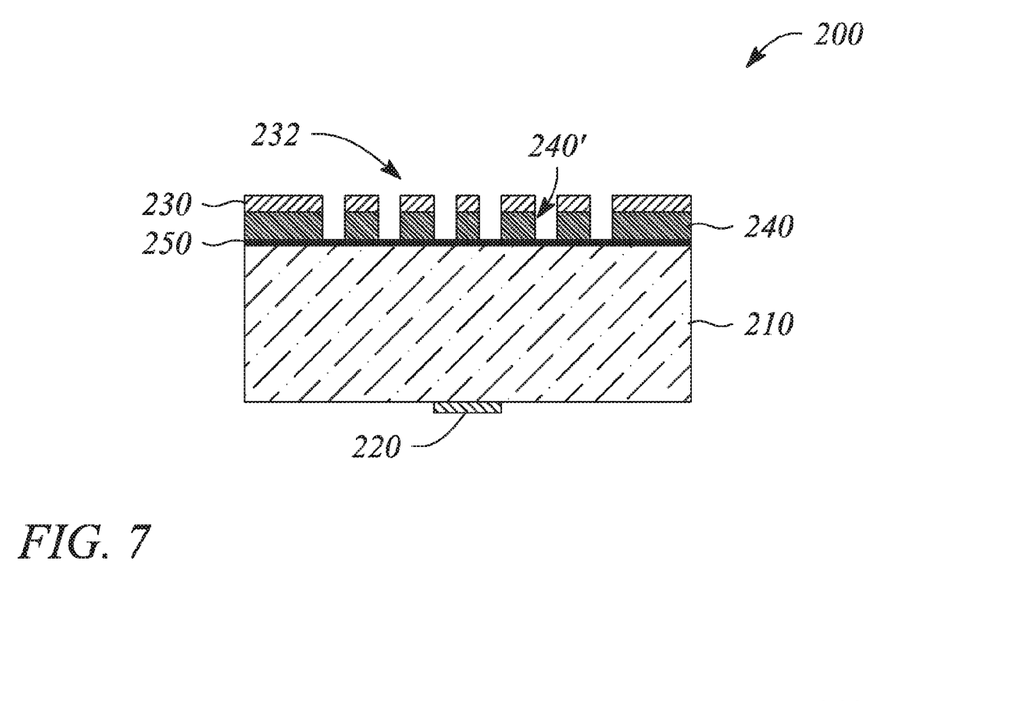
FIG. 7 illustrates a cross-sectional view of an optoelectronic modulation apparatus employing a high contrast grating, according to another example consistent with the principles described herein.

FIG. 7 illustrates a cross-sectional view of an optoelectronic modulation apparatus 200 employing a high contrast grating, according to another example consistent with the principles described herein. The HCG lens 232 may be formed by etching a pattern in the HCG layer 230. The pattern etching may further etch the spacer layer 240 below the HCG layer 230 with substantially the same pattern as the HCG lens 232 that may further expose the substrate 210 (or an antireflective coating 250 on the substrate 210) through the spacer layer 240. Accordingly, a portion 240' of the spacer layer 240 that remains below the HCG lens 232 may serve to support elements that make up the HCG lens 232. Further, while the spacer layer 240 may be substantially without a cavity, the etched portions of the spacer layer 240 between the HCG lens 232 elements provide holes through the spacer layer 240 that may serve to provide a similar reduction in an index of refractive surrounding the HCG lens 232 as would be provided by a cavity, according to some examples.

Figure 8:
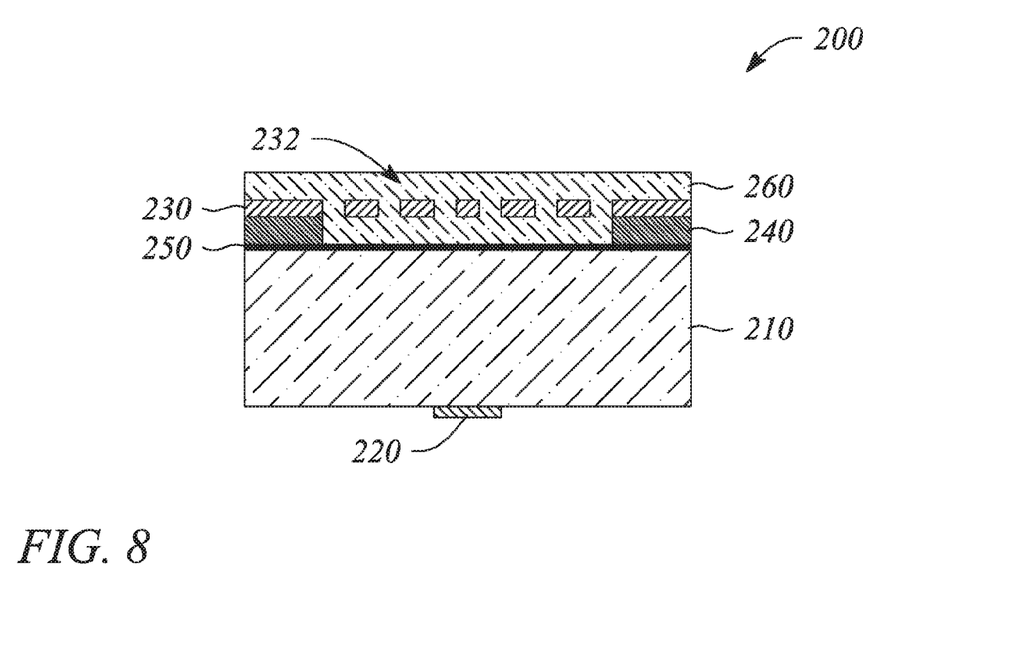
FIG. 8 illustrates a cross-sectional view of an optoelectronic modulation apparatus employing a high contrast grating, according to another example consistent with the principles described herein.

FIG. 8 illustrates a cross-sectional view of an optoelectronic modulation apparatus 200 employing a high contrast grating, according to another example consistent with the principles described herein. In particular, the HCG lens 232 of the HCG layer 230 is encapsulated by an encapsulating material 260, as illustrated in FIG. 8. The encapsulating material 260 covers a surface of the HCG layer 230 and also substantially fills both in between the HCG lens 232 elements and the cavity below the HCG lens 232, as illustrated. In some examples, the encapsulating material 260 may be substantially similar to the encapsulating material described above with respect to the optical modulation apparatus 100.

In some examples, the optoelectronic modulation apparatus 200 further includes a wafer-bonded support layer or substrate. The wafer-bonded support substrate is configured to support the HCG layer 230 adjacent to the second surface of the transparent substrate 210. For example, the HCG layer 230 may be provided on the wafer-bonded support substrate. The wafer-bonded support substrate may then be wafer bonded onto the transparent substrate 210 to position the HCG layer 230 adjacent to the substrate second surface. In some examples, the HCG layer 230 is on a surface of the wafer-bonded support substrate that is adjacent to and facing the transparent substrate 210 second surface. In other examples, the HCG layer 230 is on a surface of the wafer-bonded support substrate that is opposite to the surface of the wafer-bonded support substrate that is adjacent to and facing the transparent substrate second surface.

According to various examples, the wafer-bonded support substrate may include substantially any material or combination of materials that may be used to support the HCG layer 230 and further that may be wafer bonded to the transparent substrate 210. For example, the wafer-bonded support substrate may include glass or a similar optically transparent material. In other examples, the wafer-bonded support substrate may include a semiconductor material such as, but not limited to, one or more of silicon (Si), gallium arsenide (GaAs) and indium phosphide (InP). The wafer-bonded support substrate may have a coefficient of thermal expansion (CTE) that is matched to a CTE of the transparent substrate 210, according to some examples. For example, a glass material that is CTE matched to a material of the transparent substrate 210 may be employed for the wafer-bonded support substrate. In some examples, the wafer-bonded support substrate and the transparent substrate 210 may include the same material.

Figure 9:
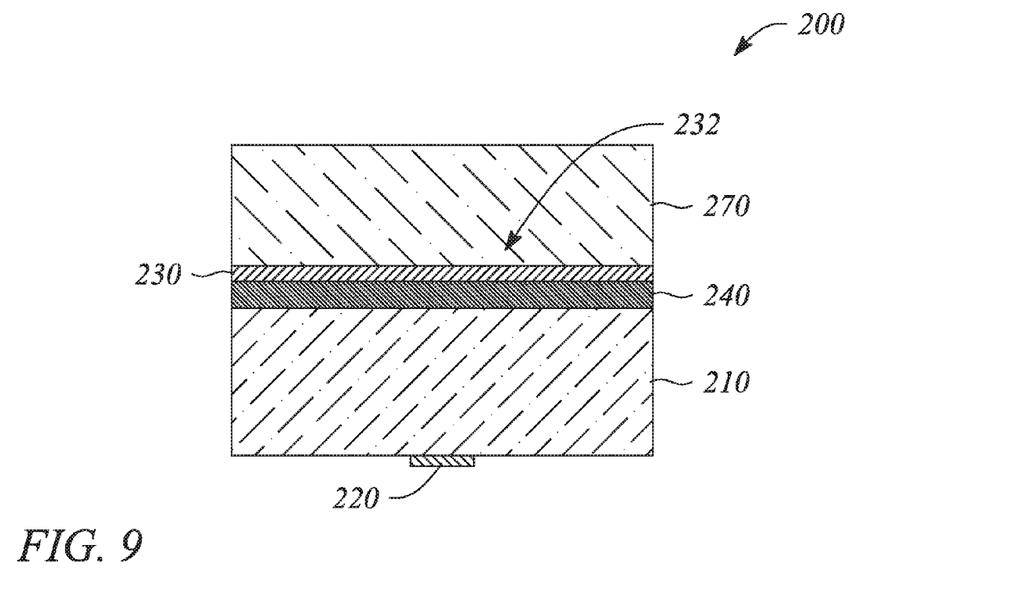
FIG. 9 illustrates a cross-sectional view of an optoelectronic modulation apparatus employing a high contrast grating, according to another example consistent with the principles described herein.

FIG. 9 illustrates a cross-sectional view of an optoelectronic modulation apparatus 200 employing a high contrast grating, according to another example consistent with the principles described herein. In particular, FIG. 9 illustrates the optoelectronic modulation apparatus 200 including the transparent substrate 210, the optoelectronic modulator 220 at a first surface of the transparent substrate 210, and the HCG layer 230 with the HCG lens 232 adjacent to and spaced from a second surface of the transparent substrate 210 by a spacer layer 240. FIG. 9 also illustrates a wafer-bonded support substrate 270 configured to support the HCG layer 230 from a side of the HCG layer 230 opposite to the side that is adjacent to the transparent substrate second surface. As illustrated, HCG layer 230 is between transparent substrate 210 second surface and the wafer-bonded support substrate 270. According to some examples (not illustrated), the spacer layer 240 may be omitted.

Figure 10:
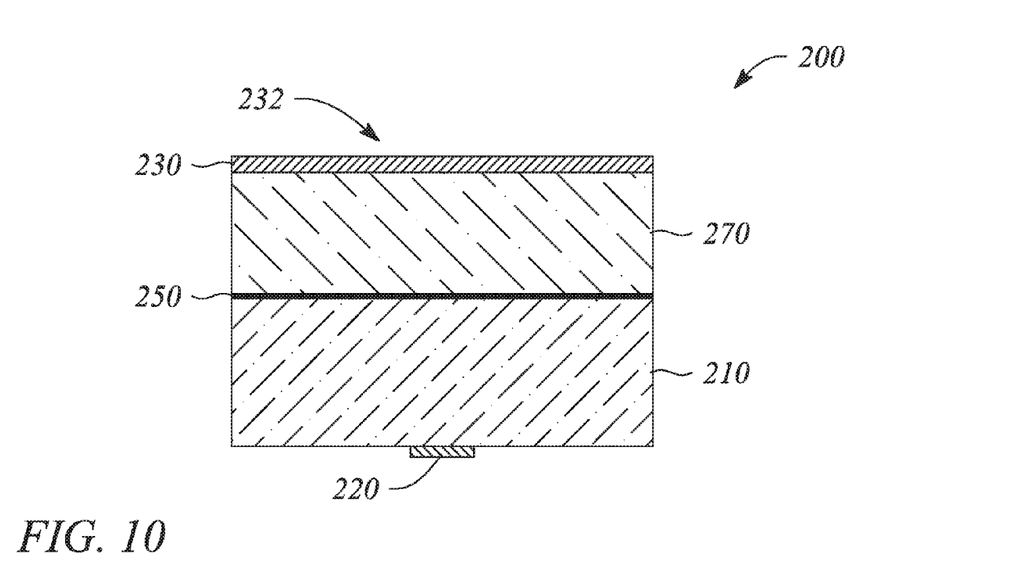
FIG. 10 illustrates a cross-sectional view of an optoelectronic modulation apparatus employing a high contrast grating, according to another example consistent with the principles described herein.

FIG. 10 illustrates a cross-sectional view of an optoelectronic modulation apparatus 200 employing a high contrast grating, according to another example consistent with the principles described herein. In this example, the optoelectronic modulation apparatus 200 includes the transparent substrate 210, the optoelectronic modulator 220 at a first surface of the transparent substrate 210, the HCG layer 230 with the HCG lens 232, and the wafer-bonded support substrate 270, described above with respect to FIG. 9. However, as illustrated in FIG. 10, the wafer-bonded support substrate 270 is between the HCG layer 230 and the second surface of the transparent substrate 210. FIG. 10 also illustrates an antireflective layer 250 between the wafer-bonded support substrate 270 and the transparent substrate 210. The antireflection layer 250 may reduce or even prevent a reflection from an interface between the transparent substrate 210 and the wafer-bonded support substrate 270 of differing materials, for example.

Figure 11:
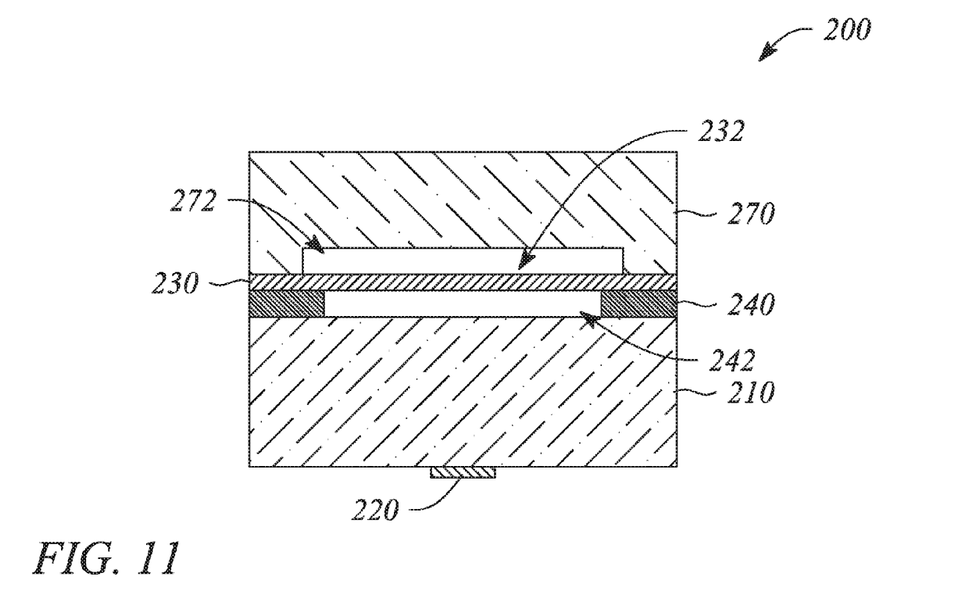
FIG. 11 illustrates a cross-sectional view of an optoelectronic modulation apparatus employing a high contrast grating, according to another example consistent with the principles described herein.

FIG. 11 illustrates a cross-sectional view of an optoelectronic modulation apparatus 200 employing a high contrast grating, according to another example consistent with the principles described herein. The optoelectronic modulation apparatus 200 illustrated in FIG. 11 is similar to the optoelectronic apparatus illustrated in FIG. 9. However, as illustrated in FIG. 11, both the spacer layer 240 and the wafer-bonded support substrate 270 include cavities that coincide with the HCG lens 232. In particular, the spacer layer 240 includes a cavity 242 and the wafer-bonded support substrate 270 includes a cavity 272. The cavities 242, 272 may improve a performance of the HCG lens 232 by reducing a refractive index of the medium surrounding the HCG lens 232, according to various examples. An antireflective layer (not illustrated) may be included in one or both of the cavities 242, 272 to reduce reflection at an interface between a material of the transparent substrate 210 and the wafer-bonded support substrate 270 and the respective cavities thereof. Also, while not separately illustrated, the configuration of FIG. 11 may include either of the cavities 242, 272 without the other, according to some examples. Further, one or both of the examples illustrated in FIGS. 7-8 may be realized with a wafer-bonded support substrate, similar to the example illustrated in FIG. 9.

In some examples consistent with the principles described herein, a method of optical modulation is provided. In some examples, the method of optical modulation may be provided by the optical modulation apparatus 100, described above. In other examples, the optoelectronic modulation apparatus 200 described above may be used to realize the method of optical modulation described herein.

Figure 12:
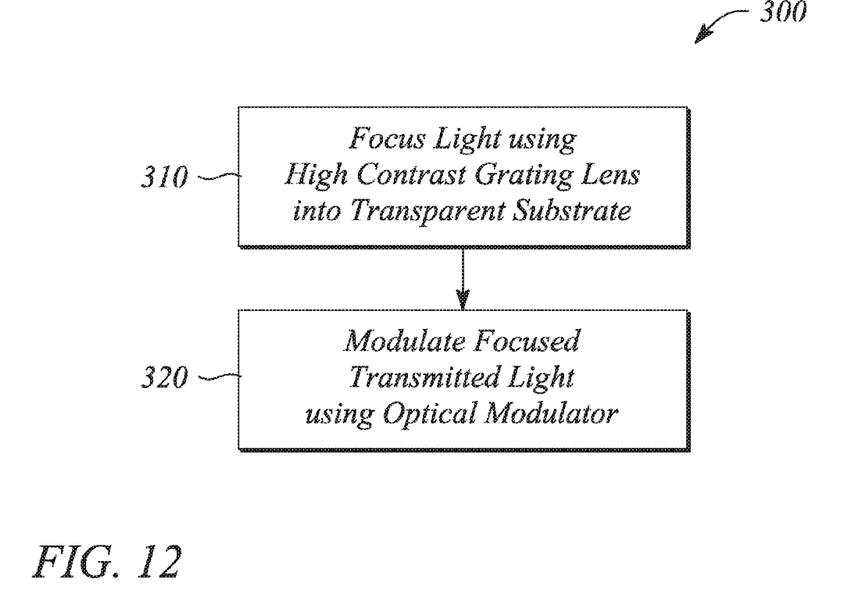
FIG. 12 illustrates a flow chart of a method of optical modulation, according to an example consistent with the principles described herein.

FIG. 12 illustrates a flow chart of a method 300 of optical modulation, according to an example consistent with the principles described herein. The method 300 of optical modulation includes focusing 310 light into a transparent substrate using a high contrast grating (HCG) lens. The focused light passes through the transparent substrate between the HCG lens and an optical modulator. In particular, the optical modulator and the HCG lens are adjacent to opposite surfaces of the transparent substrate. In some examples, the HCG lens is substantially similar to either the HCG lens 120 of the optical modulation apparatus 100, described above. In some examples, the transparent substrate is substantially similar to the substrate 106 described above with respect to the optical modulation apparatus 100.

The method 300 of optical modulation further includes modulating 320 the focused light transmitted through the transparent substrate using the optical modulator. The modulated 320 light is transmitted out of the optical modulator one or both of adjacent to a first side of the optical modulation apparatus and in an opposite direction back through the transparent substrate adjacent a second side of the optical modulation apparatus.

In some examples, the optical modulator is a Fabry-Perot modulator. For example, the Fabry-Perot modulator may be substantially similar to the Fabry-Perot modulator 110 described above with respect to the optical modulation apparatus 100. In particular, in some examples, modulating 320 the focused light using the Fabry-Perot modulator includes one or both of modulating 320 using electrorefraction modulation and modulating 320 using electroabsorption modulation of the focused light.

Thus, there have been described examples of an optical or optoelectronic modulation apparatus and a method of optical modulation that employ a high contrast grating as a lens. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A high contrast grating optical modulation apparatus comprising:
    an optical modulator at a front surface of a substrate, the optical modulator to modulate light received by the optical modulation apparatus; and
    a high contrast grating (HCG) lens adjacent to a back surface of the substrate opposite to the front surface, the FICG lens to focus light incident on the optical modulation apparatus as the received light onto the optical modulator,
    wherein the substrate is transparent to operational wavelengths of the focused incident light and the modulated light.

2. The high contrast grating optical modulation apparatus of claim 1, wherein the optical modulator is a Fabry-Perot modulator comprising a Fabry-Perot cavity and a modulation material within the Fabry-Perot cavity.

3. The high contrast grating optical modulation apparatus of claim 2, wherein the Fabry-Perot modulator is one or both of an electrorefraction modulator having an electrorefraction material as the modulation material and an electroabsorption modulator having an electroabsorption material as the modulation material.

4. The high contrast grating optical modulation apparatus of claim 2, wherein the Fabry-Perot modulator comprises an active layer between a pair of distributed Bragg reflectors, the active layer comprising one of a bulk semiconductor material and multiple quantum wells.

5. The high contrast grating optical modulation apparatus of claim 1, further comprising an optical circulator to separate the modulated light produced by the optical modulator from the incident light, wherein the high contrast grating optical modulation apparatus is a reflective optoelectronic modulator.

6. The high contrast grating optical modulation apparatus of claim 1, further comprising another HCG lens adjacent to the back surface of the substrate and laterally 1, displaced from the incident light focusing HCG lens, the other HCG lens to focus and tilt the modulated light produced by the optical modulator, wherein the lateral displacement of the respective HCG lenses provides a separation of the incident light and the modulated light.

7. The high contrast grating optical modulation apparatus of claim 1, wherein the optical modulator is a transmissive optical modulator to emit the modulated light in a direction away from the front surface of the substrate and the HCG lens.

8. An optoelectronic modulation apparatus employing a high contrast grating comprising:
- a transparent substrate having a first surface and a second surface opposite the first surface, the transparent substrate to transmit light incident on the optoelectronic modulation apparatus between the first surface and the second surface;
- an optoelectronic modulator at the first surface of the transparent substrate, the optoelectronic modulator to modulate the transmitted incident light received through the transparent substrate from the second surface; and
- a high contrast grating (HCG) layer adjacent to the transparent substrate second surface, the HCG layer comprising an HCG lens to focus the incident light onto the optoelectronic modulator as the transmitted incident light.

9. The optoelectronic modulation apparatus employing a high contrast grating of claim 8, wherein optoelectronic modulator comprises a Fabry-Perot modulator to provide one or both of electrorefraction modulation and electroabsorption modulation of the transmitted incident light.

10. The optoelectronic modulation apparatus employing a high contrast grating of claim 8, further comprising a spacer layer between the HCG layer and the transparent substrate, the spacer layer to provide a cavity to suspend the HCG lens spaced from the second surface of the transparent substrate.

11. The optoelectronic modulation apparatus employing a high contrast grating of claim 8, further comprising a wafer-bonded support substrate to support the HCG layer on a surface of the wafer-bonded substrate.

12. The optoelectronic modulation apparatus employing a high contrast grating of claim 11, wherein the HCG layer is on the surface of the wafer-bonded support substrate adjacent to and facing the transparent substrate second surface.

13. The optoelectronic modulation apparatus employing a high contrast grating of claim 11, wherein the HCG layer is on the surface of the wafer-bonded support substrate opposite a surface of the wafer-bonded support substrate that is adjacent to and facing the transparent substrate second surface.

14. A method of optical modulation, the method comprising:
- focusing light into a transparent substrate using a high contrast grating (HCG) lens, the focused light transmits through the transparent substrate between the HCG lens and an optical modulator; and
- modulating the focused light transmitted through the transparent substrate using the optical modulator, the optical modulator and the HCG lens being respectively adjacent to opposite surfaces of the transparent substrate,
- wherein the modulated light is transmitted out of the optical modulator one or both of back through the transparent substrate and in a direction opposite to the transparent substrate.

15. The method of optical modulation of claim 14, wherein the optical modulator is a Fabry-Perot modulator, and wherein modulating the focused light using the Fabry-Perot modulator comprises one or both of modulating using electrorefraction modulation and modulating using electroabsorption modulation of the focused light.

* * * * *